United States Patent
Jaffri

(10) Patent No.: US 12,288,124 B2
(45) Date of Patent: Apr. 29, 2025

(54) RFID-INTEGRATED INDICIA-READING DEVICE AND METHODS WITH INCREASED READ RANGE VIA MODE DETECTION

(71) Applicant: ZEBRA TECHNOLOGIES CORPORATION, Lincolnshire, IL (US)

(72) Inventor: Rehan Jaffri, Tarrytown, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/367,699

(22) Filed: Sep. 13, 2023

(65) Prior Publication Data
US 2025/0086413 A1 Mar. 13, 2025

(51) Int. Cl.
| G06K 7/10 | (2006.01) |
| G06K 7/00 | (2006.01) |
| G06K 7/14 | (2006.01) |

(52) U.S. Cl.
CPC ....... *G06K 7/10386* (2013.01); *G06K 7/0008* (2013.01); *G06K 7/1417* (2013.01); *G06K 2007/10524* (2013.01)

(58) Field of Classification Search
CPC ............. G06K 7/10386; G06K 7/0008; G06K 7/1417; G06K 2007/10524
See application file for complete search history.

(56) References Cited

U.S. PATENT DOCUMENTS 4,766,297 A * 8/1988 McMillan .......... G06K 7/10861
235/462.07
8,610,542 B2 12/2013 Jenkins et al.

* cited by examiner

*Primary Examiner* — Jamara A Franklin

(57) ABSTRACT

A RFID-integrated indicia reading device and methods with increased read range via mode detection is provided. The device comprises an imaging assembly configured to capture two-dimensional image data appearing in a first field of view; an antenna assembly including at least one antenna element, being arranged proximate to the imaging assembly within a housing; and, a controller, coupled to the imaging and antenna assemblies, configured to determine a presentation operating mode of the device and a handheld operating mode of the device. The presentation operating mode is indicative of the device being positioned in a cradle, and the handheld operating mode is indicative of the device being held by and positioned in front of a user. The controller, in response to determining the device is in handheld operating mode, increases a transmit power of the antenna element, which generates backward energy that reflects from the user and increases a forward read range of the device.

17 Claims, 4 Drawing Sheets

RFID-INTEGRATED INDICIA-READING DEVICE AND METHODS WITH INCREASED READ RANGE VIA MODE DETECTION

BACKGROUND

Indicia reading devices (e.g., handheld scanners) are often utilized to read barcodes and/or radio frequency identification ("RFID") tags that are affixed to objects to register pricing, track inventory, and a variety of other purposes. These devices often face strict design requirements to which the device must adhere such that the scanner is compact and ergonomically user-friendly. RFID antennas are generally required to be a certain size based on the frequency of operation and the resulting wavelength. Indicia reading devices that integrate both barcode reading and RFID functionality face issues in meeting such size requirements.

These challenges result in performance issues for integrated antennas, as RFID antennas are designed for directional performance, in which indicia, e.g. RFID tags, are read at a certain read range in front of the reader. For example, integrated RFID antennas are generally limited to short range performance due to poor front-to-back ratio resulting in lesser control of a radiation pattern.

SUMMARY

RFID-integrated indicia reading device and methods with increased read range via mode detection is provided. The present disclosure includes a device comprising an imaging assembly configured to capture two-dimensional (2D) image data appearing in a first field of view (FOV); an antenna assembly including at least one antenna element, the at least one antenna element being arranged proximate to the imaging assembly within a housing; a transceiver operatively connected to the antenna assembly and, a controller, communicably coupled to the imaging assembly and antenna assembly, configured to determine a presentation operating mode of the device and a handheld operating mode of the device. The presentation operating mode being indicative of the device being positioned in a cradle, and the handheld operating mode being indicative of the device being held by and positioned in front of a user. The controller, in response to determining the device is in the handheld operating mode, increases a transmit power of the antenna element, the increased transmit power generating backward energy that reflects forward from the user and increases a forward read range of the device.

In a variation of this embodiment, the controller is further configured to analyze the 2D image data to identify indicia present in the 2D image data, decode, via a decode module, payload data of the indicia, and transmit the payload data to a host.

In another variation of this embodiment, the cradle is configured to support the device in the presentation operating mode, and the controller determines the handheld operating mode by detecting a removal of the device from the cradle and determines the presentation operating mode by detecting that the device is present in the cradle.

In another variation of this embodiment, the controller determines the handheld operating mode by at least one of detecting a change in position of the device and an input to a trigger of the device.

In another variation of this embodiment, detecting a change in the position of the device is based on at least one input from at least one of an accelerometer and a gyroscope.

In another variation of this embodiment, detecting a change in the position of the device includes determining, via the controller, a change in position based on changes in the 2D image data.

In another variation of this embodiment, the device further comprises an input mechanism configured to receive an input from a user, wherein the controller determines the presentation operating mode and the handheld operating mode based on the input to the input mechanism.

In another variation of this embodiment, the controller, in response to detecting a change from a handheld operating mode to a presentation operating mode, decreases the transmit power of the at least one antenna element.

In another embodiment, the present disclosure includes a method of reading indicia comprising performing an imaging operation via an imaging assembly, the imaging assembly being configured to capture two-dimensional (2D) image data of an environment appearing in a first field of view (FOV), disposed within a housing of an indicia reading device along with an antenna assembly having at least one antenna element and with a transceiver operatively connected to the antenna assembly; detecting an operating mode of the indicia reading device via a controller communicably coupled to the imaging assembly and antenna assembly; and, in response to detecting the device in a handheld operating mode, increasing the transmit power of the antenna element. The method continues to include reflecting RF energy emitted from the antenna element off of a user of the indicia reading device in the forward direction of the FOV.

In another variation of this embodiment, performing an imaging operation includes analyzing the 2D image data to identify indicia present in the 2D image data, decoding, via a decode module, payload data of the indicia, and transmitting the payload data to a host.

In another variation of this embodiment, detecting a presentation operating mode includes detecting that the device is present in a cradle configured to support the indicia reading device and detecting a handheld operating mode includes detecting that the device is not present in the cradle.

In another variation of this embodiment, the controller determines the handheld operating mode by at least one of detecting a change in position of the device and an input to a trigger of the device.

In another variation of this embodiment, detecting a change in the position of the device is based on at least one input from at least one of an accelerometer and a gyroscope.

In a variation of this embodiment, detecting a change in the position of the device includes determining a change in position based on changes in the 2D image data.

In another variation of this embodiment, detecting a handheld operating mode includes receiving an input from a trigger.

In a variation of this embodiment, detecting an operating mode includes receiving an input from an input mechanism configured to receive an input from a user and determining the operating mode based on the input to the input mechanism.

In another variation of this embodiment, detecting a change in the operating mode of the device, and, in response to detecting a change from a handheld operating mode to a presentation operating mode, decreasing the transmit power of the antenna element.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
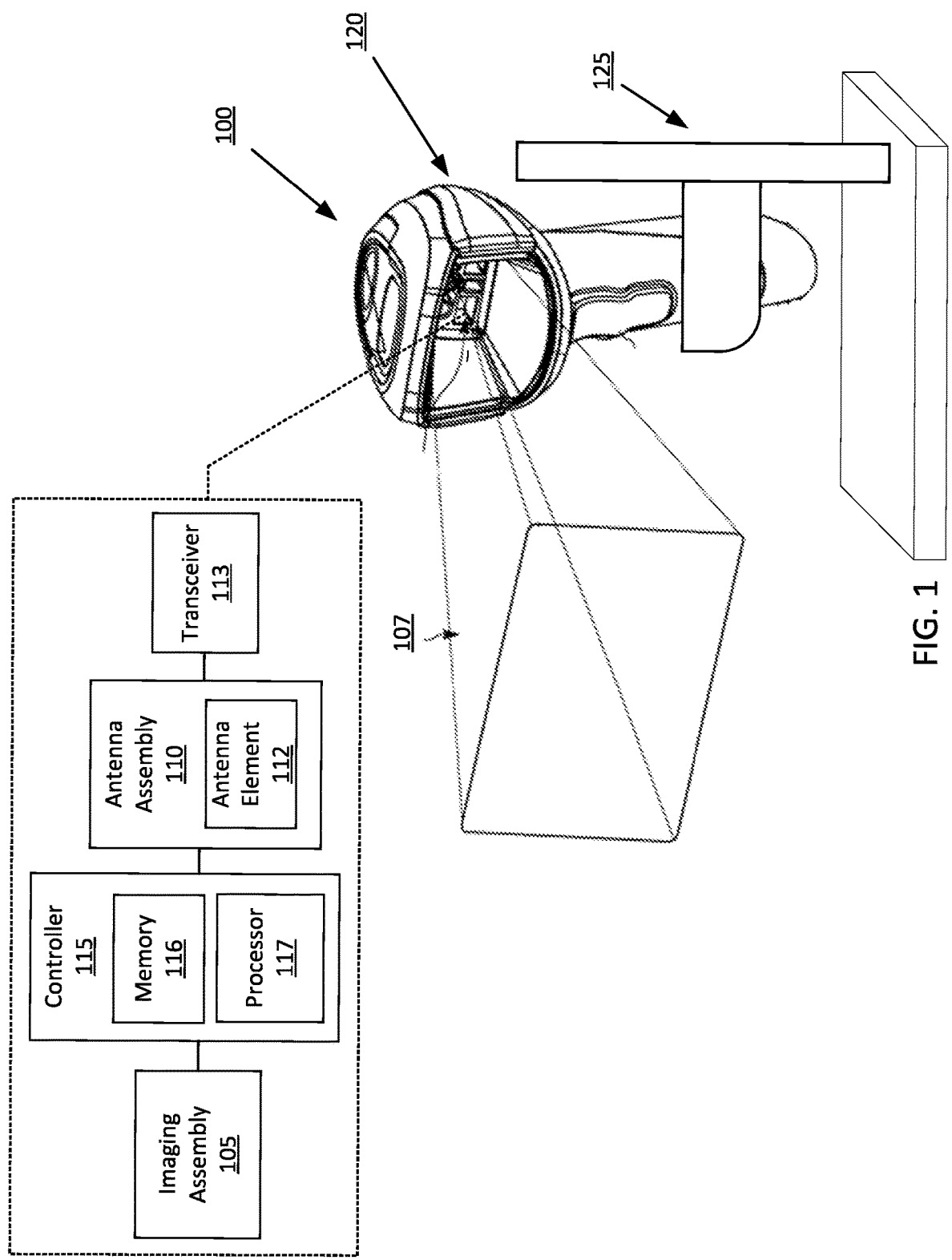
FIG. 1 illustrates an example system of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Indicia-reading devices which integrate RFID functionality often position the RFID antenna as far from the scanning engine of the barcode reader as possible to ensure proper RFID functionality. However, this results in an RFID-integrated indicia-reading device (e.g., a scanner with RFID) increasing in overall size which could result in a device that is bulky and/or that fails to meet application design requirements. Accordingly, an RFID-integrated indicia reading device with an increased read range that maintains a compact form would be beneficial.

Figure 2:
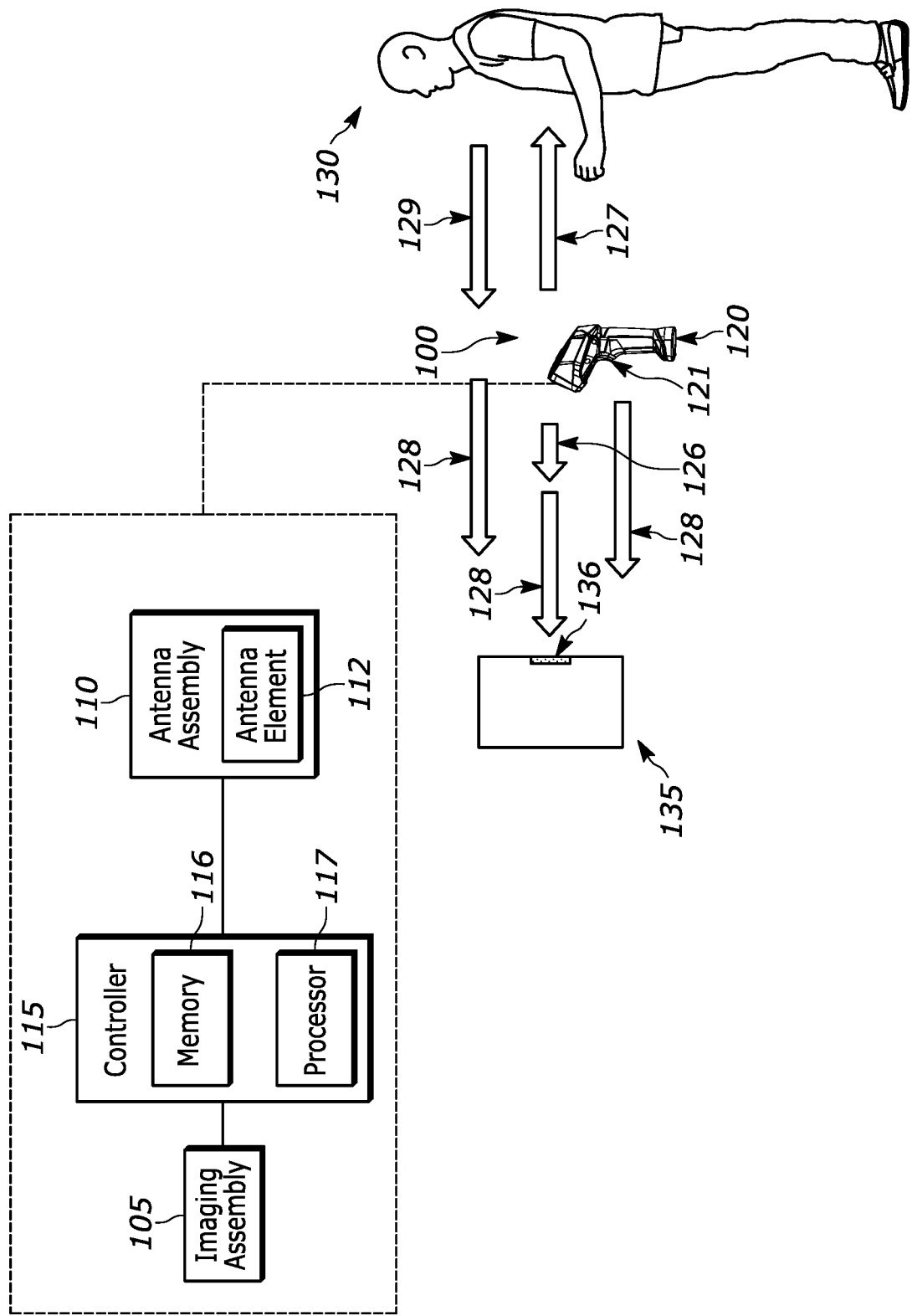
FIG. 2 illustrates an additional example system of the present disclosure.

FIG. 1 illustrates an example device of the present disclosure. The device 100 may include an imaging assembly 105 configured to capture two-dimensional (2D) image data appearing in a first field of view (FOV) 107. The device 100 may also include an antenna assembly 110 including at least one antenna element 112, the at least one antenna element 112 being arranged proximate to the imaging assembly 105 within a housing 120. The antenna assembly 110 may further include or connect to a transceiver 113 which allows for radio frequency ("RF") transmit/receive functionality in order to provide the device 100 with RFID reading capabilities. Accordingly, both the transceiver 113 and the antenna assembly 105 are RFID capable and provide the device 100 with the ability to read an RFID tag. The device 100 may further include a controller 115 connected to the imaging assembly 105 and the antenna assembly 110. The controller 115, having at least a memory 116 and a processor 117, may be configured to determine an operating mode of the device 100. For example, the controller 115 may be configured to determine whether the device 100 is to operate in a presentation operating mode or a handheld operating mode (or additional modes). The presentation operating mode may be indicative of the device 100 being positioned in a cradle 125, and the handheld operating mode may be indicative of the device 100 being held by and positioned in front of a user 130 (as shown in FIG. 2). The cradle 125 may be configured to support the device 100 in the presentation operating mode.

FIG. 2 illustrates another example device of the present disclosure, the device 100 being in a handheld operating mode. A user 130 may remove the device 100 from a cradle (e.g., cradle 125 shown in FIG. 1) to read an indicia 136 affixed to an item 135 by operating the device 100 in a handheld operating mode. In a handheld operating mode, the user 130 is positioned behind the device 100 and the item 135 and indicia 136 are positioned in front of the device 100, as shown in FIG. 2. The controller 115 may determine that the device 100 is in the handheld operating mode in response to an input to a trigger 121. The controller 115 may also determine that the device 100 is in the handheld operating mode based on detecting that the device 100 has been removed from the cradle 125. As mentioned below, the controller 115 may also determine that the device 100 is operating in a presentation operating mode based on detecting that the device 100 is present in the cradle 125. In response to determining that the device 100 is in a handheld operating mode, the controller 115 may be configured to increase a transmit power of the antenna element 112. The increased transmit power results in increased transmission of RF energy from the antenna element 112 in the direction of and in the opposite direction of the indicia 136 intended to be read, i.e. the increased transmit power generates higher forward energy 126 and backwards energy 127. The backwards energy 127 reflects forward in the direction of the indicia 136 off the user 130, and this reflected energy 129 combines with the emitted forward energy 126. As a result of this combined energy 128, the forward read range of the device 100 increases allowing the device 100 to be used in applications requiring a longer read range.

For example, a user 130 may be a clerk in a retail setting such as a grocery store who is reading indicia on items with an RFID-integrated barcode scanner as a part of an inventory process. User 130 may need to scan the indicia 136 affixed to item 135; however, the indicia 136 may be positioned too far away for the device 100 to read the indicia 136. Accordingly, the user 130 may operate the device 100 in a handheld operating mode, for example by removing the device 100 from a cradle or stand 125. The controller 115 may determine the device 100 is in a handheld operating mode and in response, increase the transmit power provided to the antenna element 112. This increases the amount of energy radiated toward the item 135 from the device 100 and the amount of energy radiated in the opposite direction of the device 100, e.g., toward the user 130. In indicia readers generally, increased radiation in directions other than toward the indicia 136 increases the likelihood of erroneous reads, for example of other indicia located behind and/or to either side of the device 100, and lacks the range and the directionality required to read the indicia 136 affixed to item 135. However, in a handheld operating mode of the present disclosure, the user 130 is positioned behind the device 100, and thus the increased transmit power of the antenna element 112 generates RF energy in a backward direction, e.g. energy 127, toward the user 130 which reflects off the user 130 and toward item 135, e.g. reflected energy 129. This reflected energy 129 in combination with the RF energy transmitted from the antenna element 112 toward the item 135 provide a front-to-back ratio to achieve an increased read range to read the indicia 136 affixed to the item 135 via imaging assembly 105.

Figure 3:
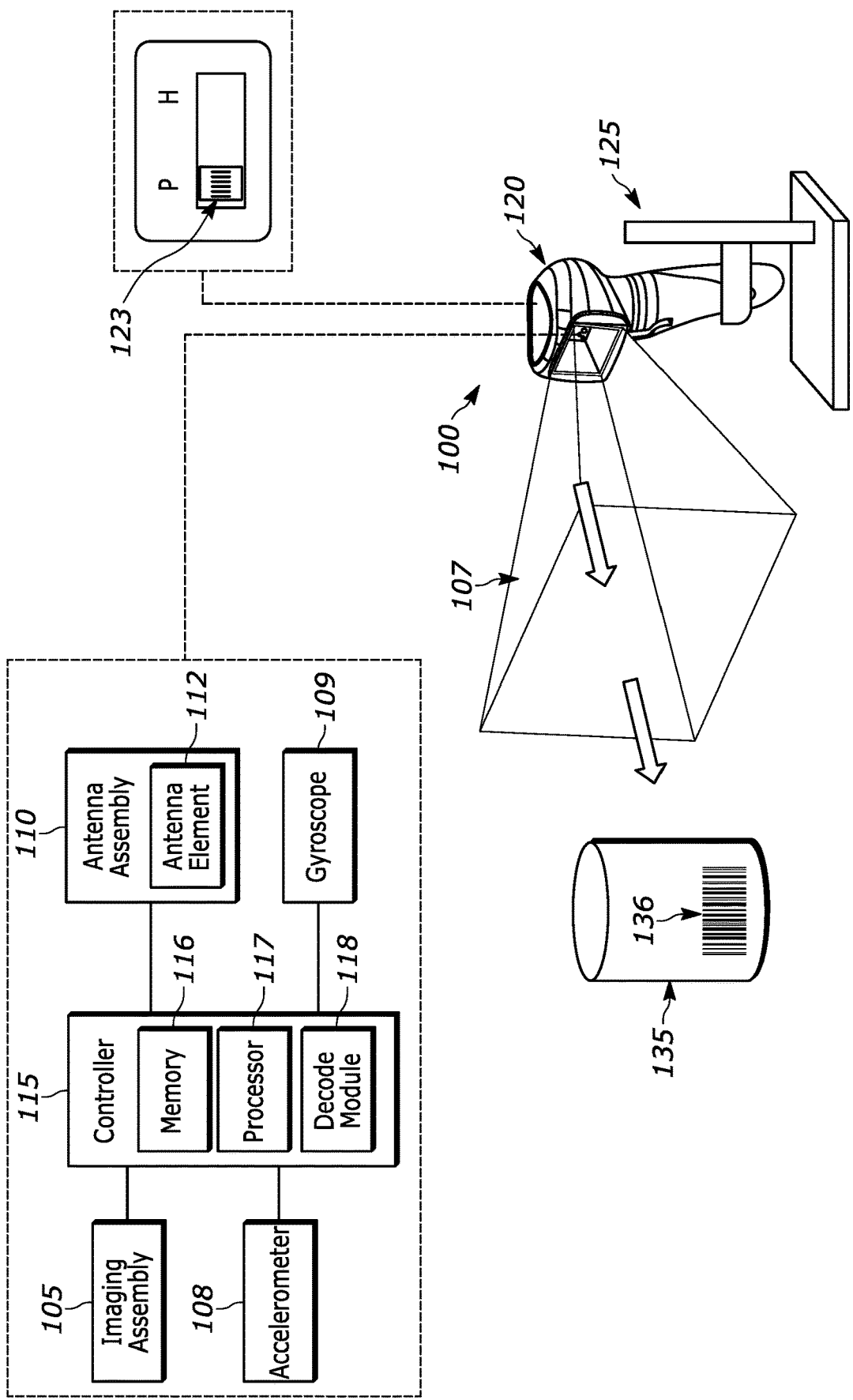
FIG. 3 illustrates an additional example system of the present disclosure.

FIG. 3 illustrates another example device 100 of the present disclosure, the device 100 being in a presentation operating mode. The device 100 may further include a decode module 118. The controller 115 may be configured to analyze the 2D image data, captured via the imaging assembly 105, to identify indicia 136 present in the 2D image data, decode, via the decode module 118, payload data of the indicia 136, e.g. indicia 136 on item 135, and transmit the payload data to a host (not shown). The controller 115 may also be configured to detect that the device 100 has changed position and determine the operating mode of the device 100, either handheld or presentation, based on the change in position. For example, the controller 115 may determine that the device 100 has changed position based on changes in the 2D image data, which may be at least in part on an input from the decode module 118. The device 100 may also include an accelerometer 108 and a gyroscope 109. The controller 115 may determine that the device 100 is in a handheld operating mode based on at least one input from the accelerometer 108 and gyroscope 109. For example, a user 130 may remove the device 100 from cradle 125 to read an indicia 136 on an item located in a customer's cart. In response to this motion, gyroscope 109 or accelerometer 108 output a signal to the controller 115 via which, at least in part, the controller 115 detects that the device 100 is in a handheld operating mode. In another example, a user 130 using the device 100 in a handheld operating mode places the device 100 in the cradle 125. The accelerometer 108 may signal that the device 100 is stationary, and in response, the controller 115 may determine that the device is in a presentation operating mode based on this signal from the accelerometer 108. In response to this determination, the controller 115 may decrease the transmit power of the antenna element 112 because, in a presentation mode, the user 130 is generally not in the same position as in a handheld operating mode and the increased transmit power of a handheld operating mode would lead to erroneous indicia reads and a lack of requisite control of directionality of the RF energy transmitted by the antenna element 112.

The system may further comprise an input mechanism configured to receive an input from a user, for example, a user 130 may toggle a two-position switch 123 to signal to the controller 115 that the device 100 is changing operating modes. Any other suitable input mechanism may alternatively be used.

Figure 4:
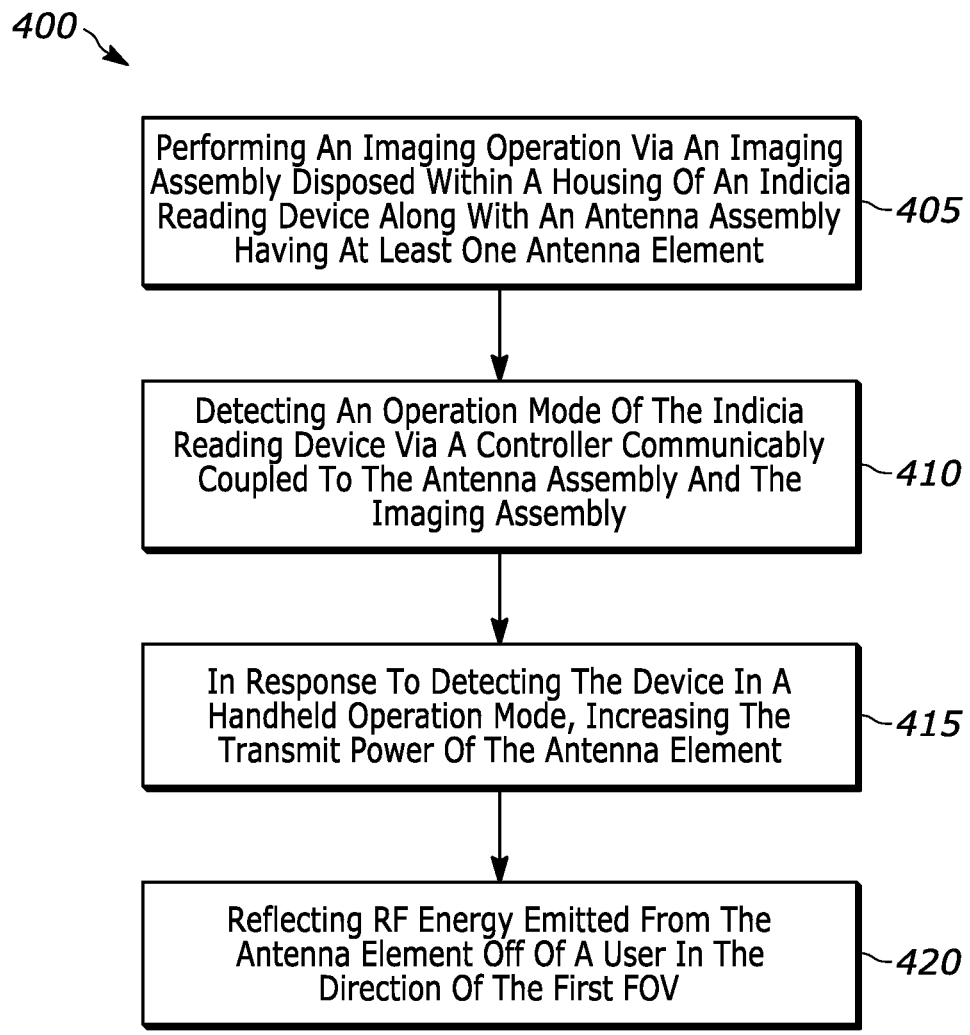
FIG. 4 is a flowchart illustrating an example method of the present disclosure.

FIG. 4 is a block flowchart illustrating a method of the present invention. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. The method 400 may be performed by processing logic that may comprise hardware (circuitry, dedicated logic, etc.), software, or a combination of both.

Method 400 includes performing an imaging operation via an imaging assembly, configured to capture two-dimensional (2D) image data of an environment appearing in a first field of view (FOV), disposed within a housing of an indicia reading device 100 along with and proximate to an antenna assembly having at least one antenna element 112 (block 505). For example, a grocery store clerk may use the device 100 to capture 2D image data of a can with a barcode affixed thereto. The controller 115 may decode the payload data encoded in the indicia from this 2D image data. Accordingly, performing an imaging operation may include analyzing the 2D image data to identify indicia present in the 2D image data, decoding, via a decode module, payload data of the indicia, and transmitting the payload data to a host.

Example method 400 further includes detecting an operating mode of the indicia reading device via a controller 115 communicably coupled to the imaging assembly 105 and antenna assembly 110 (block 410). For example, the clerk may remove the device 100 from a support stand, which sends a signal to the controller 115, based on which, at least in part, the controller 115 determines that the device 100 is in a handheld operating mode.

The example method 400 also includes, in response to detecting the device 100 in a handheld operating mode, increasing the transmit power of the antenna element 112 (block 415). For example, the controller 115 may determine that the device 100 is in a handheld operating mode, and increase the power to antenna element 112, resulting in the antenna element 112 emitting more RF energy in all directions, including generating backward energy that propagates in the direction of the user positioned behind the device 100.

The example method 400 further includes reflecting this increased RF energy emitted from the antenna element 112 off of a user in the direction of the first FOV, i.e. in the direction in front of the device 100 (block 420). For example, the increased RF energy emitted by the antenna element 112 results in RF energy being transmitted backwards or in the direction of the user 130 (i.e. behind the device 100). This RF energy is reflected off of the user 130 and towards the direction of the first FOV 107. This reflected energy combines with the RF energy originally emitted in this direction to increase the read range of the indicia reading device 100, allowing a user to implement the device in applications requiring longer read ranges.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations.

Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device comprising:
an imaging assembly configured to capture two-dimensional (2D) image data appearing in a first field of view (FOV);
an antenna assembly including at least one radio frequency identification (RFID) antenna element, the at least one RFID antenna element being arranged proximate to the imaging assembly within a housing;
a transceiver operatively connected to the antenna assembly; and
a controller, communicably coupled to the imaging assembly and antenna assembly, configured to determine a presentation operating mode of the device and a handheld operating mode of the device, the presentation operating mode being indicative of the device being positioned in a cradle and the handheld operating mode being indicative of the device being held by and positioned in front of a user, wherein the controller, in response to determining the device is in the handheld operating mode, increases a transmit power of the at least one RFID antenna element, the increased transmit power generating backward energy that reflects forward from the user and increases a forward read range of the device to read an RFID tag.

2. The device of claim 1, wherein the controller is further configured to analyze the 2D image data to identify indicia present in the 2D image data, decode, via a decode module, payload data of the indicia, and transmit the payload data to a host.

3. The device of claim 1, wherein the cradle is configured to support the device in the presentation operating mode, and the controller determines the handheld operating mode by detecting a removal of the device from the cradle and determines the presentation operating mode by detecting that the device is present in the cradle.

4. The device of claim 1, wherein the controller determines the handheld operating mode by at least one of detecting a change in position of the device and an input to a trigger of the device.

5. The device of claim 4, wherein detecting a change in the position of the device is based on at least one input from at least one of an accelerometer and a gyroscope.

6. The device of claim 5, wherein detecting a change in the position of the device includes determining, via the controller, a change in position based on changes in the 2D image data.

7. The device of claim 1, further comprising an input mechanism configured to receive an input from a user, wherein the controller determines the presentation operating mode and the handheld operating mode based on the input to the input mechanism.

8. The device of claim 1, wherein the controller, in response to detecting a change from a handheld operating mode to a presentation operating mode, decreases the transmit power of the at least one RFID antenna element.

9. A method of reading indicia comprising:
performing an imaging operation via an imaging assembly, the imaging assembly being configured to capture two-dimensional (2D) image data of an environment appearing in a first field of view (FOV) and being disposed within a housing of an indicia reading device with an antenna assembly having at least one radio frequency identification (RFID) antenna element, and a transceiver operatively connected to the antenna assembly;
determining an operating mode of the indicia reading device via a controller communicably coupled to the imaging assembly and antenna assembly;
in response to detecting the device is in a handheld operating mode, increasing the transmit power of the RFID antenna element; and
reflecting radio frequency (RF) energy emitted from the antenna element off of a user in a direction of the first FOV that increases a forward read range of the device to read an RFID tag.

10. The method of claim 9, wherein performing an imaging operation includes analyzing the 2D image data to identify indicia present in the 2D image data, decoding, via a decode module, payload data of the indicia, and transmitting the payload data to a host.

11. The method of claim 9, wherein detecting a presentation operating mode includes detecting that the device is present in a cradle configured to support the indicia reading device and detecting the handheld operating mode includes detecting a that the device is not present in the cradle.

12. The method of claim 11, wherein the controller determines the handheld operating mode by at least one of detecting a change in position of the device and an input to a trigger of the device.

13. The method of claim 11, wherein detecting a change in the position of the device is based on at least one input from at least one of an accelerometer and a gyroscope.

14. The method of claim 11, wherein detecting a change in the position of the device includes determining a change in position based on changes in the 2D image data.

15. The method of claim 9, wherein detecting the handheld operating mode includes receiving an input from a trigger.

16. The method of claim 9, wherein detecting an operating mode includes receiving an input from a user via an input mechanism and determining the operating mode based on the input to the input mechanism.

17. The method of claim 9, further comprising detecting a change in the operating mode of the device, and, in response to detecting a change from the handheld operating mode to a presentation operating mode, decreasing the transmit power of the RFID antenna element.

* * * * *